(12) United States Patent
Chamorro Gonzalez-Tablas et al.

(10) Patent No.: US 9,845,853 B2
(45) Date of Patent: Dec. 19, 2017

(54) LINEAR ELECTROMECHANICAL ACTUATOR AND ANTI-JAMMING DEVICE

(71) Applicant: CESA, Compania Espanola de Sistemas Aeronauticos, S.A., Getafe (ES)

(72) Inventors: Eduardo Chamorro Gonzalez-Tablas, Getafe (ES); Francisco Jose Aguado Lopez, Getafe (ES); Esteban Morante Lopez, Getafe (ES); Andres Jimenez Olazabal, Getafe (ES)

(73) Assignee: CESA, Compania Espanola de Sistemas Aeronauticos, S.A., Getafe (ES)

( * ) Notice: Subject to any disclaimer, the term of this patent is extended or adjusted under 35 U.S.C. 154(b) by 57 days.

(21) Appl. No.: 14/601,695

(22) Filed: Jan. 21, 2015

(65) Prior Publication Data

US 2015/0204427 A1    Jul. 23, 2015

(30) Foreign Application Priority Data

Jan. 21, 2014 (EP) ..................................... 14382016

(51) Int. Cl.
*F16H 25/20* (2006.01)
*B64C 25/24* (2006.01)
(Continued)

(52) U.S. Cl.
CPC .......... *F16H 25/205* (2013.01); *B64C 13/28* (2013.01); *B64C 13/42* (2013.01); *B64C 13/50* (2013.01);
(Continued)

(58) Field of Classification Search
CPC ....... F16H 25/205; F16H 25/20; B64C 13/28; B64C 13/42; B64C 13/50
See application file for complete search history.

(56) References Cited

U.S. PATENT DOCUMENTS

| 2,476,376 A | 7/1949 | Roland |
| 3,053,104 A | 9/1962 | Scavni |

(Continued)

FOREIGN PATENT DOCUMENTS

| EP | 0034103 | 8/1981 |
| EP | 2149496 | 2/2010 |
| EP | 2604514 | 6/2013 |

OTHER PUBLICATIONS

European Search Report, dated May 8, 2014.

*Primary Examiner* — Justin M Benedik
(74) *Attorney, Agent, or Firm* — Greer, Burns & Crain Ltd.

(57) ABSTRACT

A linear electromechanical actuator with a main screw-nut assembly driven by a main motion device and having a hollow screw with an abutting surface; an anti-jamming piston arranged coaxially within the screw and shiftable between an engaged position in which locking dogs interfere with the abutting surface and a disengaged position in which the piston is free to slide within the screw; and actuating elements configured to shift the piston from the engaged to the disengaged position upon electrical or mechanical failure of the actuator. The actuating elements include a key axially movable between the engaged and disengaged positions and having a locking section, configured to bias the locking dogs into interference with the abutting surface in the engaged position, and an unlocking section, configured to allow free sliding of the piston within the screw in the disengaged position. An anti-jamming device for operating a critical flight control surface.

10 Claims, 4 Drawing Sheets

(51) Int. Cl.
*B64C 13/28* (2006.01)
*B64C 25/20* (2006.01)
*G01L 3/26* (2006.01)
*B64C 13/42* (2006.01)
*B64C 13/50* (2006.01)

(52) U.S. Cl.
CPC .............. *B64C 25/20* (2013.01); *B64C 25/24* (2013.01); *F16H 25/20* (2013.01); *G01L 3/26* (2013.01); *F16H 2025/2071* (2013.01); *Y02T 50/44* (2013.01); *Y10T 74/186* (2015.01)

(56) References Cited

U.S. PATENT DOCUMENTS

| | | | |
|---|---|---|---|
| 4,472,348 A | | 9/1984 | Desfontaines |
| 4,745,815 A | * | 5/1988 | Klopfenstein .......... B64C 13/38 244/228 |
| 8,224,502 B2 | * | 7/2012 | Brueckner .............. B64C 13/28 701/3 |
| 2010/0024580 A1 | | 2/2010 | Hadley et al. |
| 2010/0213311 A1 | * | 8/2010 | Flatt ........................ B64C 13/42 244/99.4 |
| 2013/0001357 A1 | * | 1/2013 | Cyrot ...................... B64C 13/42 244/99.4 |
| 2013/0152717 A1 | * | 6/2013 | Kopecek ................ B64C 13/28 74/89.39 |

* cited by examiner

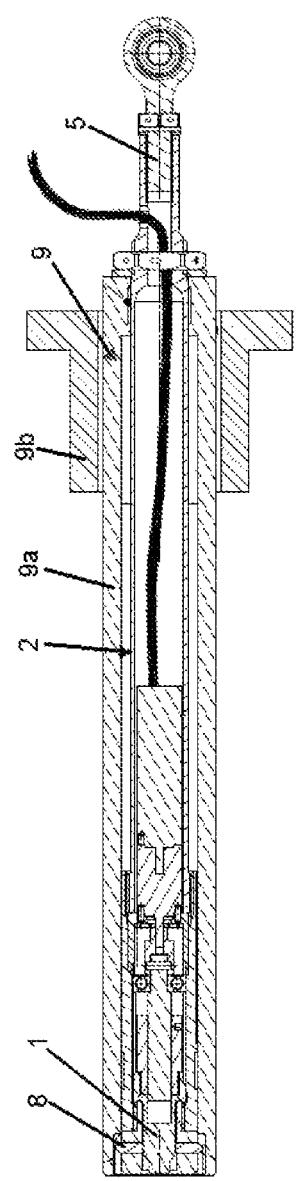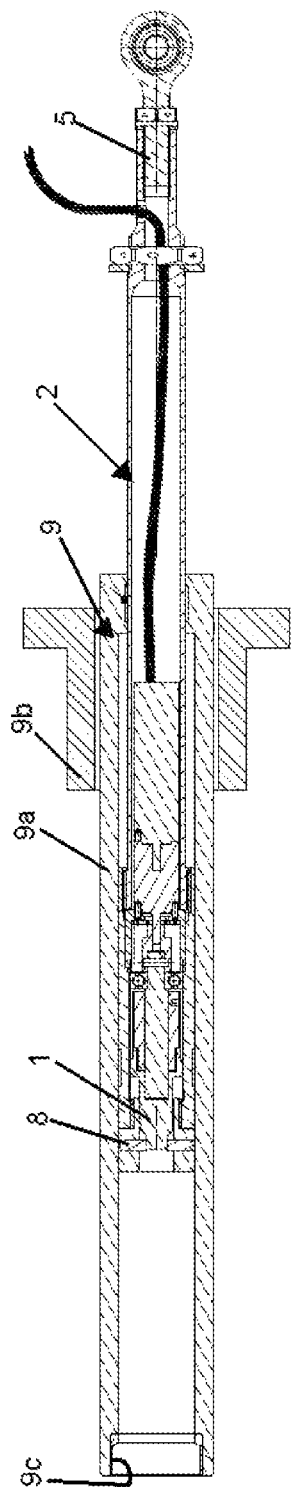
FIG. 1
FIG. 2

LINEAR ELECTROMECHANICAL ACTUATOR AND ANTI-JAMMING DEVICE

CROSS-REFERENCES TO RELATED APPLICATIONS

This application claims the benefit of the European patent application No. 14382016.5 filed on Jan. 21, 2014, the entire disclosures of which are incorporated herein by way of reference.

FIELD OF THE INVENTION

The present invention refers to a linear electromechanical actuator with an anti-jamming piston shiftable from an engaged position to a disengaged position upon electrical or mechanical failure of the linear electromechanical actuator.

A further aspect refers to an anti-jamming device for operating a critical flight control surface.

BACKGROUND OF THE INVENTION

Linear electromechanical actuators have been incorporated in aircraft over past years to operate critical flight elements, such as flight control surfaces and landing gear, while reducing fuel consumption due to the weight reduction obtained through the substitution of hydraulic and pneumatic systems for these lighter systems.

Critical flight elements mount redundant linear electromechanical actuators to ensure their operability upon electrical or mechanical failure of one of the linear electromechanical actuators. To this end, the failed linear electromechanical actuator must freely extend and follow the movement of the working linear electromechanical actuator that continues to operate the critical flight element.

Landing gears typically mount only one linear electromechanical actuator that must freely extend due to gravity upon electrical or mechanical failure of the linear electromechanical actuator.

Different solutions aimed at preventing failure of critical flight elements upon electrical or mechanical failure of one of the linear electromechanical actuators have been developed up to now.

A first solution consists of a linear electromechanical actuator with a screw-nut assembly engaged by means of a clutch to a gearbox driven by an electrical motor. Upon electrical or mechanical failure of the linear electromechanical actuator, actuation of the clutch disengages the screw-nut assembly from the gearbox, thus allowing free extension of the linear electromechanical actuator.

This solution does not prevent screw jamming, the main mechanical cause of failure of linear electromechanical actuators, as the disengagement occurs upstream of the screw-nut assembly.

Another solution consists of a pyrotechnic linear electromechanical actuator with a screw-nut assembly driven by an electric motor and a fuse-type piston engaged to the screw-nut assembly by retaining elements. Upon electrical or mechanical failure of the linear electromechanical actuator, explosive loads adjacent to the retaining elements are activated to destroy the retaining elements, which in turn allows free extension of the linear electromechanical actuator.

Any kind of electrical or mechanical failure will result in permanent disengagement of the fuse-type piston as the retaining elements have been destroyed. Therefore, the linear electromechanical actuator must be entirely mounted anew on the critical flight element after electrical or mechanical failure. This highly increases reparation costs.

A further problem with this solution results from the impossibility to carry out functional tests to ensure the correct behavior of the linear electromechanical actuator before installing it on the critical flight control element. Therefore, correct functionality of the linear electromechanical actuator must be entrusted.

SUMMARY OF THE INVENTION

It is therefore an object of the present invention to provide a linear electromechanical actuator that allows free extension of the linear electromechanical actuator upon electrical or mechanical failure, while reducing reparation costs and allowing testing prior to its installation.

This object is achieved with a linear electromechanical actuator with at least a main screw-nut assembly driven by a main motion device and having at least a hollow screw having an abutting surface. An anti-jamming piston is arranged coaxially within the hollow screw, the anti-jamming piston is shiftable between an engaged position in which a plurality of locking dogs interfere with the abutting surface and a disengaged position in which the anti-jamming piston is free to slide within the hollow screw. Actuating elements are configured to shift the anti-jamming piston from the engaged position to the disengaged position upon electrical or mechanical failure of the linear electromechanical actuator.

The actuating elements include at least a key axially movable between the engaged position and the disengaged position and having a locking section, which is configured to bias the locking dogs into interference with the abutting surface in the engaged position, and an unlocking section, which is configured to allow free sliding of the anti-jamming piston within the hollow screw in the disengaged position.

After electrical or mechanical failure of the linear electromechanical actuator, reengagement of the linear electromechanical actuator is possible if no catastrophic failure of the main screw-nut assembly occurs.

In a first step, the main motion device drives the screw-nut assembly to reintroduce the anti-jamming piston within the hollow screw as neither the main motion device nor the main screw-nut assembly are catastrophically affected by the electrical or mechanical failure.

Next, the key is axially moved from the disengaged position to the engaged position, forcing the locking dogs back into interference with the abutting surface of the hollow screw. As a result the anti-jamming piston is reengaged with the main screw-nut assembly and ready to use.

If a catastrophic failure of the main screw-nut assembly occurs, the main screw-nut assembly can be either repaired or substituted for a new one, hence reducing reparation costs as there is no need to substitute the entire linear electromechanical actuator, just the affected part.

In an embodiment of the linear electromechanical actuator, the actuating elements include a secondary screw-nut assembly driven by a secondary motion device and configured to axially move the key between the engaged position and the disengaged position.

In this embodiment, upon electrical or mechanical failure of the linear electromechanical actuator, the secondary motion device powers the secondary screw-nut assembly which in turn moves the key between the engaged and the disengaged positions.

In a further embodiment, the linear electromechanical actuator also includes failure detecting elements configured to measure the actuator's efficiency and to generate a command signal that sets off the actuating elements in case the actuator's efficiency falls behind a threshold actuator efficiency level.

This embodiment further reduces reparation costs as it permits identifying electrical and mechanical failures at an early stage, thus avoiding catastrophic failures of the main screw-nut assembly.

In another embodiment of the linear electromechanical actuator, the actuating elements include elastic elements having a stiffness configured to axially move the key between the engaged position and the disengaged position through its elastic deformation in case the axial component of the load of the main screw-nut assembly transmitted through the locking dogs in the engaged position surpasses the maximum axial load of the main screw-nut assembly.

In this embodiment, electrical or mechanical failures of the linear electromechanical actuator that cause an axial load in the main screw-nut assembly that surpasses its maximum axial load, elastically deform the elastic elements and in turn cause the axial movement of the key from the engaged position to the disengaged position.

Upon termination of this excessive loading the linear electromechanical actuator can be reengaged and reused.

Another aspect of the invention refers to a landing gear with at least a linear electromechanical actuator.

A further aspect of the invention refers to an anti-jamming device, for operating a critical flight element, with at least two linear electromechanical actuators.

Yet another aspect of the invention refers to a tail portion of an aircraft with at least a critical flight element and at least an anti-jamming device configured to operate the critical flight element.

Still yet another aspect of the invention refers to a wing portion of an aircraft with at least a critical flight element and at least an anti-jamming device configured to operate the critical flight element.

Still another further aspect of the invention refers to an aircraft with at least a critical flight element and at least an anti-jamming device configured to operate the critical flight element.

BRIEF DESCRIPTION OF THE DRAWINGS

FIG. 1 shows a sectional longitudinal view of a linear electromechanical actuator during normal operation according to an embodiment of the invention.

FIG. 2 shows a sectional longitudinal view of a linear electromechanical actuator after an electrical or mechanical failure according to an embodiment of the invention.

DETAILED DESCRIPTION OF THE PREFERRED EMBODIMENTS

Figure 3:
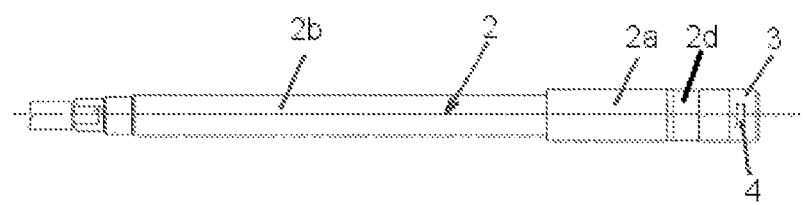
FIG. 3 shows a longitudinal view of an anti-jamming piston of a linear electromechanical actuator according to an embodiment of the invention.

An embodiment of the present invention for a linear electromechanical actuator with an anti-jamming piston 2 shiftable from an engaged position (see FIG. 1) to a disengaged position (see FIG. 2) upon electrical or mechanical failure of the linear electromechanical actuator will be described hereinafter with reference to FIGS. 1 to 3.

The linear electromechanical actuator depicted in FIG. 1 comprises a main screw-nut assembly 9, with a hollow screw 9a and a nut 9b, which is driven by a main motion device (not represented). Within the hollow screw 9a an anti-jamming piston 2 is arranged coaxially and engaged during normal operation of the main screw-nut assembly 9.

Optionally, the distal end of the anti-jamming piston 2 comprises a fastener 5 that rotatably couples the anti-jamming piston 2 to a pivot fitting installed on a critical flight element (not represented), such as a flight control surface or landing gear.

The linear electromechanical actuator also has actuating elements configured to shift the anti-jamming piston 2 from the engaged position depicted in FIG. 1 to the disengaged position depicted in FIG. 2 upon electrical or mechanical failure.

The actuating elements comprise a key 1 with a locking section 1a (see FIGS. 4 through 7) configured to bias the anti-jamming piston 2 in engagement with the hollow screw 9a in the engaged position and an unlocking section 1b (see FIGS. 4 through 7) configured to allow free sliding of the anti-jamming piston 2 within the hollow screw 9a in the disengaged position.

During normal operation of the linear electromechanical actuator the anti-jamming piston 2 remains in engagement with the hollow screw 9a by means of a plurality of locking dogs 8 that interfere with an abutting surface 9c (see FIG. 2) of the hollow screw 9a and which are biased into said interference with the abutting surface 9c by means of the locking section 1a of the key 1.

FIG. 2 shows the linear electromechanical actuator after an electrical or mechanical failure. Here the anti-jamming piston 2 is disengaged from the main screw-nut assembly 9 and free to slide within the hollow screw 9a.

When the linear electromechanical actuator is mounted on a flight control surface to operate said flight control surface, at least a second linear electromechanical actuator is mounted to ensure operation of the flight control surface upon electrical or mechanical failure of one of the linear electromechanical actuators.

Hence, upon electrical or mechanical failure of one of the linear electromechanical actuators, the working linear electromechanical actuators are able to continue to operate the flight control surface as the anti-jamming piston 2 of the failed linear electromechanical actuator slides within the hollow screw 9a, following the failed linear electromechanical actuator the movement of the working linear electromechanical actuators.

When the linear electromechanical actuator is mounted on a landing gear, upon electrical or mechanical failure of the linear electromechanical actuator the landing gear is able to extend itself due to gravity.

Redundant linear electromechanical actuators may also be optionally employed in landing gears and other critical flight elements.

Optionally, the anti-jamming piston 2 further comprises guiding elements configured to guide the plurality of locking dogs 8 into and from interference with the abutting surface 9*c* of the hollow screw 9*a*.

Figure 4:
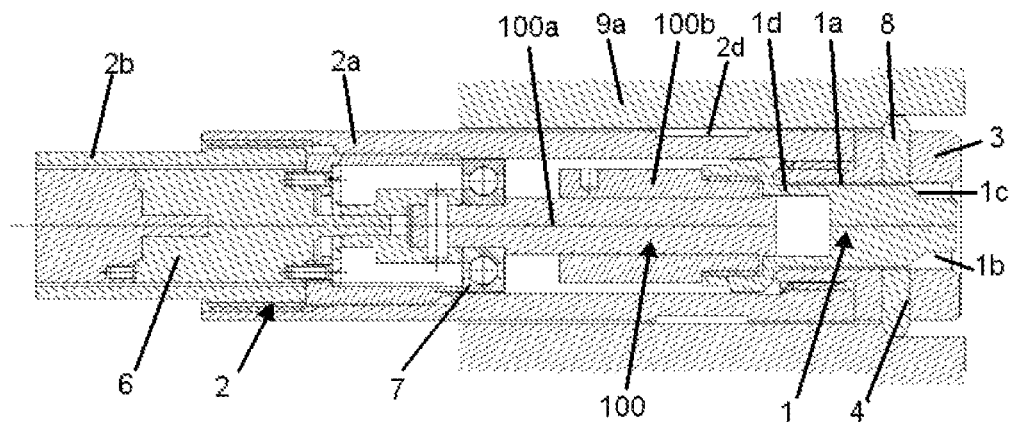
FIG. 4 shows a detailed sectional longitudinal view of the anti-jamming piston during normal operation of the linear electromechanical actuator according to a first embodiment of the invention.
Figure 5:
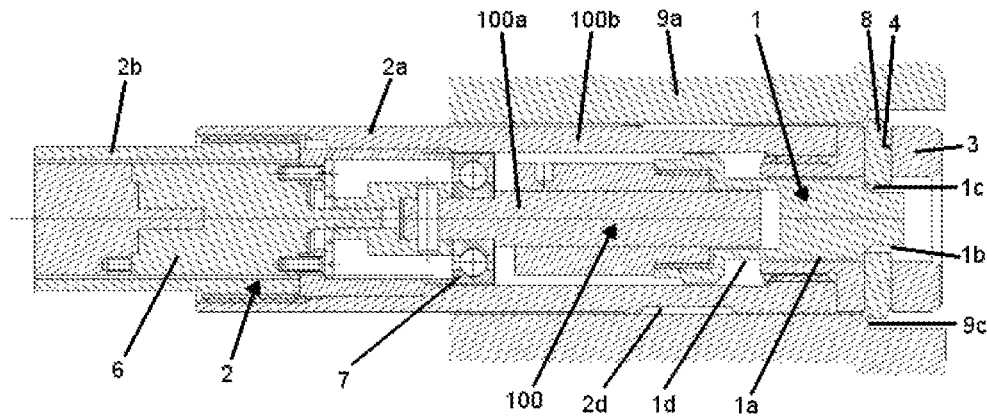
FIG. 5 shows a detailed sectional longitudinal view of the anti-jamming piston upon electrical or mechanical failure of the linear electromechanical actuator according to the first embodiment of the invention.
Figure 6:
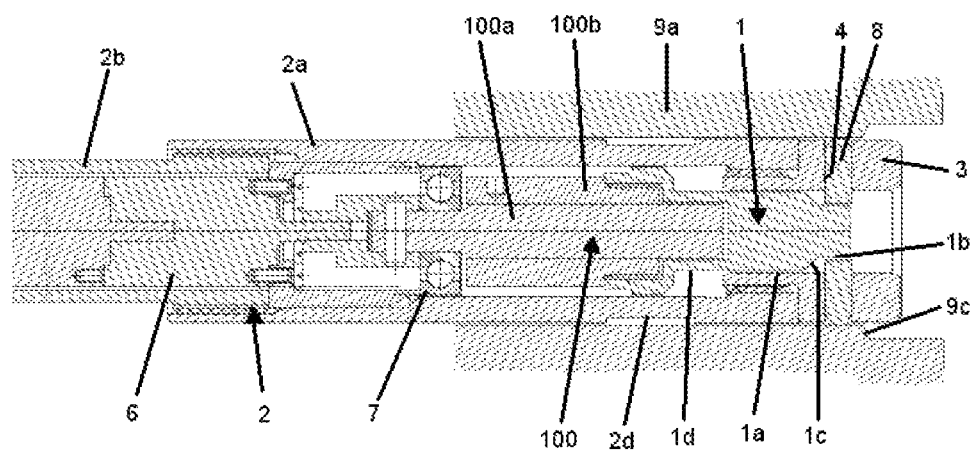
FIG. 6 shows a detailed sectional longitudinal view of the anti-jamming piston after electrical or mechanical failure of the linear electromechanical actuator according to the first embodiment of the invention.

An embodiment of the guiding elements has been depicted in FIG. 3, the guiding elements including a guiding piston 3 detachably coupled to the anti-jamming piston 2 (see FIGS. 4 through 6). The guiding piston 3 has a plurality of guiding slots 4, wherein each guiding slot 4 is configured to guide one locking dog 8 into and from interference with the abutting surface 9*c* of the hollow screw 9*a*.

This embodiment is advantageous as the guiding piston 3 can be detached from the anti-jamming piston 2 for maintenance purposes and even substituted without need to substitute the entire anti-jamming piston 2 in case of, for example, wear of the guiding slots 4.

In another possible embodiment of the guiding elements (not represented), the plurality of guiding slots 4 are included at the proximal end of the anti-jamming piston 2.

Optionally, the anti-jamming piston 2 includes a sleeve 2*a* configured to guide sliding of the anti-jamming piston 2 within the hollow screw 9*a* upon electrical or mechanical failure of the linear electromechanical actuator and a tubular strut 2*b* detachably coupled to the sleeve 2*a*. The sleeve 2*a* may be tubular (see FIGS. 4 through 6) or comprise a recess 2*c* (see FIG. 7) configured to house the actuating elements.

This is further advantageous as the sleeve 2*a* requires a better surface finish than the tubular strut 2*b* so as to reduce friction against the hollow screw 9*a* with which is in sliding contact. Once again, this embodiment further eases maintenance operations and permits substitution of the sleeve 2*a* or the tubular strut 2*b* without need to substitute the entire anti-jamming piston 2.

Optionally, the anti-jamming piston 2 includes a groove 2*d* configured to house a slide ring (not represented) that further reduces friction between the anti-jamming piston 2 and the hollow screw 9*a*. The groove 2*d* is preferably located in the sleeve 2*a* when present.

A first embodiment of the actuating elements has been depicted in FIGS. 4 through 6. Herein the actuating elements include a secondary screw-nut assembly 100 driven by a secondary motion device 6 and configured to axially move the key 1 between the engaged position and the disengaged position.

The secondary screw-nut assembly 100 comprises a secondary screw 100*a* and a secondary nut 100*b*. In these figures it can be appreciated that the secondary screw 100*a* is rotatably coupled to and driven by the secondary motion device 6, whereas the secondary nut 100*b* is detachably coupled to a tubular flange 1*d* of the key 1.

In another possible embodiment (not represented), the secondary nut 100*b* is rotatably coupled to and driven by the secondary motion device 6, whereas the key 1 is mounted on the secondary screw 100*a*, either coupled or abutted.

Optionally, a bearing 7 is mounted around the secondary screw 100*a* and within the anti-jamming piston 2 to reduce vibrations and misalignments between the secondary screw-nut assembly 100 and the anti-jamming piston 2. As depicted in FIGS. 4 through 6, the bearing 7 is preferably mounted within the tubular sleeve 2*a* as this element has a better surface finish than the tubular strut 2*b* as explained before.

The critical flight element may be operated by an anti-jamming device (not represented) including at least two linear electromechanical actuators. In case of electrical or mechanical failure of one of the linear electromechanical actuators, the working linear electromechanical actuator will be able to continue operating the critical flight element and the failed linear electromechanical actuator will follow the movement of the working linear electromechanical actuator without introducing any axial constraint.

Under normal operating conditions, the main screw-nut assemblies 9 of each one of the linear electromechanical actuators are driven by their respective main motion devices, thus operating the critical flight element to which they are coupled.

In this situation each anti-jamming piston 2 is in the engaged position depicted in FIG. 4, where the plurality of locking dogs 8 interfere with the abutting surface 9*c* of the hollow screw 9*a*. The locking section 1*a* of the key retains the locking dogs 8 into interference with the abutting surface 9*c*, hence preventing sliding of the anti-jamming piston 2 within the hollow screw 9*a*.

Upon electrical or mechanical failure of one of the linear electromechanical actuators, the secondary motion device 6 is powered up, initiating rotation of the secondary screw 100*a* within the secondary nut 100*b*, which in turn initiates axial movement of the key 1.

As the axial movement of the key 1 advances, the locking section 1*a* slides away from the locking dogs 8 with which it ends losing contact. In FIG. 5 it can be appreciated that the locking dogs 8 neither contact the locking section 1*a* nor the unlocking section 1*b*, but a camming section 1*c* located between the locking and unlocking sections 1*a*, 1*b* which is configured to guide the locking dogs 8 between the locking and unlocking sections 1*a*, 1*b*.

Further advancement of the axial movement of the key 1 initiates sliding of the locking dogs 8 against the camming section 1*c*, while the locking dogs 8 are guided by the guiding slots 4 from interference with the abutting surface 9*c* as represented in FIG. 5.

When the locking dogs 8 are in sliding contact only with the unlocking section 1*b* of the key 1 the secondary motion device 6 is stopped. Now the locking dogs 8 do not interfere with the abutting section 9*a* as represented in FIG. 6. Hence, the anti-jamming piston 2 is disengaged from the hollow screw 9*a*.

In another possible embodiment (not represented), the key 1 has no camming section 1*c* between the locking and unlocking sections 1*a*, 1*b*, which results in rapid disengagement of the anti-jamming piston 2 from the hollow screw 9*a* as the locking dogs 8 shift from contacting with the locking section 1*a* to contacting the unlocking section 1*b* of the key 1.

Meanwhile, the working linear electromechanical actuator continues normal operation of the critical flight element.

The camming section 1*c* is advantageous as it eases guidance of the locking dogs 8 from the unlocking to the locking sections 1*b*, 1*a* upon reengagement of the failed linear electromechanical actuator.

Optionally, the linear electromechanical actuator has failure detecting elements (not represented) configured to measure the actuator's efficiency $\eta$ and to set off the actuating elements upon electrical or mechanical failure of the linear electromechanical actuator.

The actuator's efficiency $\eta$ is a constant parameter under normal operation of the linear electromechanical actuator which is defined as the ratio between the mechanical power provided by the linear electromechanical actuator, or mechanical power out (Pout), and the electrical power consumption of the linear electromechanical actuator, or electrical power in (Pin):

$$\eta = \frac{P_{out}}{P_{in}}$$

Before an electrical or a mechanical failure occurs, the actuator's efficiency η decreases as the electrical power consumption increases to provide the same mechanical power as under normal operation of the linear electromechanical actuator. Hence, this parameter may be used to detect electrical or mechanical failures of the linear electromechanical actuator.

The failure detecting elements include at least incoming electrical power measuring elements, outcoming mechanical power measuring elements and processing elements.

The incoming electrical power measuring elements are configured to measure the electrical consumption of the linear electromechanical actuator, while the outcoming mechanical power measuring elements are configured to measure the mechanical power provided by the linear electromechanical actuator.

The processing elements are configured to calculate the ratio between the mechanical power provided by the linear electromechanical actuator and the electrical power consumption of the linear electromechanical actuator, measured by the outcoming mechanical power measuring elements and by the incoming electrical power measuring elements, respectively, to compare the calculated ratio to a reference ratio ηref, and to generate a command signal that powers up the secondary motion device 6 that drives the secondary screw-nut assembly 100 in case the calculated ratio falls behind the reference ratio ηref.

Possible embodiments of the outcoming mechanical power measuring elements include at least one of a strain gauge, a load cell, a linear variable differential transformer (LVDT), a rotational variable differential transformer (RVDT) or a resolver.

Possible embodiments of the incoming electrical power measuring elements include at least one of a voltmeter, an ammeter, an electrical current sensor or a wattmeter.

Figure 7:
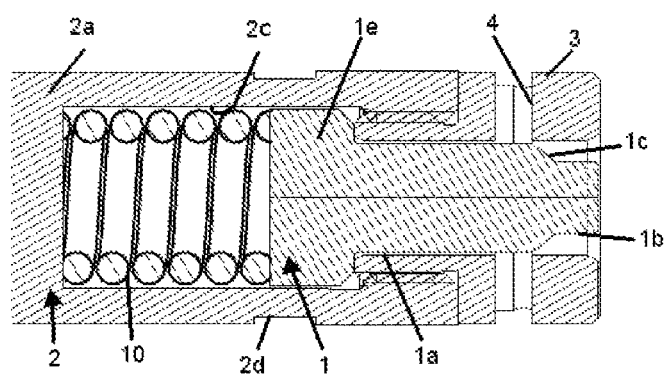
FIG. 7 shows a detailed sectional longitudinal view of an anti-jamming piston during normal operation of the linear electromechanical actuator according to a second embodiment of the invention.

A second embodiment of the actuating elements has been depicted in FIG. 7. Herein the actuating elements include elastic elements 10 having a stiffness configured to axially move the key 1 between the engaged and the disengaged positions through elastic deformation of the elastic elements 10 upon electrical or mechanical failure.

In order to prevent jamming of the main screw-nut assembly 9, which occurs when its maximum axial load is surpassed, the elastic elements 10 have a stiffness such that they deform elastically when the main screw-nut assembly 9 surpasses its maximum axial load. This maximum axial load is provided by the manufacturer.

The axial load of the main screw-nut assembly 9 is transmitted through the locking dogs 8 in the engaged position.

Optionally, the elastic elements 10 are housed within the recess 2c of the sleeve 2a and the key 1 is coupled in abutment at an abutting end 1e with the elastic elements 10.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A linear electromechanical actuator, comprising:
a main screw-nut assembly driven by a main motion device,
an anti-jamming piston arranged coaxially within a hollow screw of the main screw-nut assembly and shiftable between an engaged position in which a plurality of locking dogs interfere with an abutting surface of the hollow screw and a disengaged position in which the anti-jamming piston is free to slide within the hollow screw; and
actuating elements configured to shift the anti-jamming piston from the engaged position to the disengaged position upon electrical or mechanical failure of the linear electromechanical actuator, the actuating elements comprising a key axially movable between the engaged position and the disengaged position and comprising a locking section, configured to engage and bias the locking dogs into interference with the abutting surface in the engaged position, and an unlocking section, configured to allow the locking dogs to move away from the abutting surface and to allow free sliding of the anti-jamming piston within the hollow screw in the disengaged position.

2. The linear electromechanical actuator according to claim 1, wherein the anti-jamming piston further comprises guiding elements configured to guide the plurality of locking dogs into and out of interference with the abutting surface of the hollow screw.

3. The linear electromechanical actuator according to claim 2, wherein the guiding elements comprise a guiding piston detachably coupled to the anti-jamming piston, the guiding piston having a plurality of guiding slots, each guiding slot configured to guide one locking dog into and out of interference with the abutting surface of the hollow screw.

4. The linear electromechanical actuator according to claim 1, wherein the key further comprises a camming section located between the locking and unlocking sections and configured to guide the locking dogs between the locking and unlocking sections.

5. The linear electromechanical actuator according to claim 1, wherein the anti-jamming piston includes a groove configured to house a slide ring.

6. The linear electromechanical actuator according to claim 1, wherein the anti-jamming piston includes a sleeve configured to guide sliding of the anti-jamming piston within the hollow screw and a tubular strut detachably coupled to the sleeve.

7. The linear electromechanical actuator according to claim 6, where the sleeve comprises a recess configured to house the actuating elements.

8. The linear electromechanical actuator according to claim 1, wherein the actuating elements comprise a secondary screw-nut assembly driven by a secondary motion device and configured to axially move the key between the engaged position and the disengaged position.

9. The linear electromechanical actuator according to claim 8, further comprising:
incoming electrical power measuring elements, configured to measure the electrical consumption of the linear electromechanical actuator;
outcoming mechanical power measuring elements, configured to measure the mechanical power provided by the linear electromechanical actuator; and
processing elements, the processing elements configured to calculate the ratio η between the mechanical power provided by the linear electromechanical actuator, measured by the outcoming mechanical power measuring elements, and the electrical power consumption of the linear electromechanical actuator, measured by the incoming electrical power measuring elements, the processing elements configured to compare the calculated ratio to a reference ratio $\eta_{ref}$, and the processing elements configured to generate a command signal that activates the secondary motion device that drives the secondary screw-nut assembly in case the calculated ratio $\eta$ falls behind the reference ratio $\eta_{ref}$.

10. The linear electromechanical actuator according to claim 1, wherein the actuating elements comprise elastic elements having a stiffness configured to axially move the key between the engaged position and the disengaged position through elastic deformation in case the axial component of the load of the main screw-nut assembly transmitted through the locking dogs in the engaged position surpasses the maximum axial load of the main screw-nut assembly.

* * * * *